(12) United States Patent
Lin

(10) Patent No.: US 6,263,993 B1
(45) Date of Patent: Jul. 24, 2001

(54) TRANSMISSION ASSEMBLY FOR ELECTRICALLY POWERED BICYCLE

(75) Inventor: Klaas Lin, Taichung Hsien (TW)

(73) Assignee: Giant Manufacturing Co., Ltd., Taichung Shien (TW)

( * ) Notice: Subject to any disclaimer, the term of this patent is extended or adjusted under 35 U.S.C. 154(b) by 0 days.

(21) Appl. No.: 09/668,050

(22) Filed: Sep. 21, 2000

(51) Int. Cl.[7] ................................................. B62K 11/00
(52) U.S. Cl. ............................... 180/206; 180/207; 475/4
(58) Field of Search ................................. 180/205, 206, 180/207; 74/665 A, 665 C, 665 E; 475/4, 5

(56) References Cited

U.S. PATENT DOCUMENTS 5,570,752 * 11/1996 Takata ................................. 180/206
5,829,546 * 6/2000 Tseng ................................. 180/207
5,937,962 * 8/1999 Yokayama ............................ 180/206
5,941,333 * 8/1999 Sun et al. ............................. 180/206
6,080,073 * 6/2000 Tseng ................................. 180/207

FOREIGN PATENT DOCUMENTS

1467959 * 2/1967 (FR) ................................... 180/205

* cited by examiner

*Primary Examiner*—Daniel G. Depumpo
(74) *Attorney, Agent, or Firm*—Christie, Parker & Hale, LLP

(57) ABSTRACT

A transmission assembly for an electrically powered bicycle has a manual transmission unit and an electrical transmission unit. The electrical transmission unit includes a planetary gear device for transferring rotation of a motor shaft of a motor to a front sprocket. The electrical transmission unit further includes an auxiliary speed-reducing device, which is connected operably to a controller. Accordingly, a greater torque can be output from the electrical transmission unit to the front sprocket.

3 Claims, 8 Drawing Sheets

TRANSMISSION ASSEMBLY FOR ELECTRICALLY POWERED BICYCLE

BACKGROUND OF THE INVENTION

1. Field of the Invention

This invention relates to a bicycle, more particularly to a transmission assembly for an electrically powered bicycle, which has an electrical transmission unit that is provided with a planetary gear device.

2. Description of the Related Art

In a conventional electrically powered bicycle, the rotation of a motor shaft is transferred to a front sprocket by means of an electrical transmission unit which has a relatively large number of parts, thereby resulting in greater power loss and increased volume.

Therefore, the object of this invention is to provide a transmission assembly for an electrically powered bicycle, which has an electrical transmission unit that is provided with a planetary gear device and an auxiliary speed-reducing device so as to reduce the volume and the power loss of the assembly.

According to this invention, a transmission assembly for an electrically powered bicycle has a manual transmission unit and an electrical transmission unit. The electrical transmission unit includes a planetary gear device for transferring rotation of a motor shaft of a motor to a front sprocket.

SUMMARY OF THE INVENTION

Therefore, the object of this invention is to provide a transmission assembly for an electrically powered bicycle, which has an electrical transmission unit that is provided with a planetary gear device and an auxiliary speed-reducing device so as to reduce the volume and the power loss of the assembly.

According to this invention, a transmission assembly for an electrically powered bicycle has a manual transmission unit and an electrical transmission unit. The electrical transmission unit includes a planetary gear device for transferring rotation of a motor shaft of a motor to a front sprocket. Preferably, the electrical transmission unit further includes an auxiliary speed-reducing device, which is connected operably to a controller. Accordingly, a greater torque can be output from the electrical transmission unit to the front sprocket.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
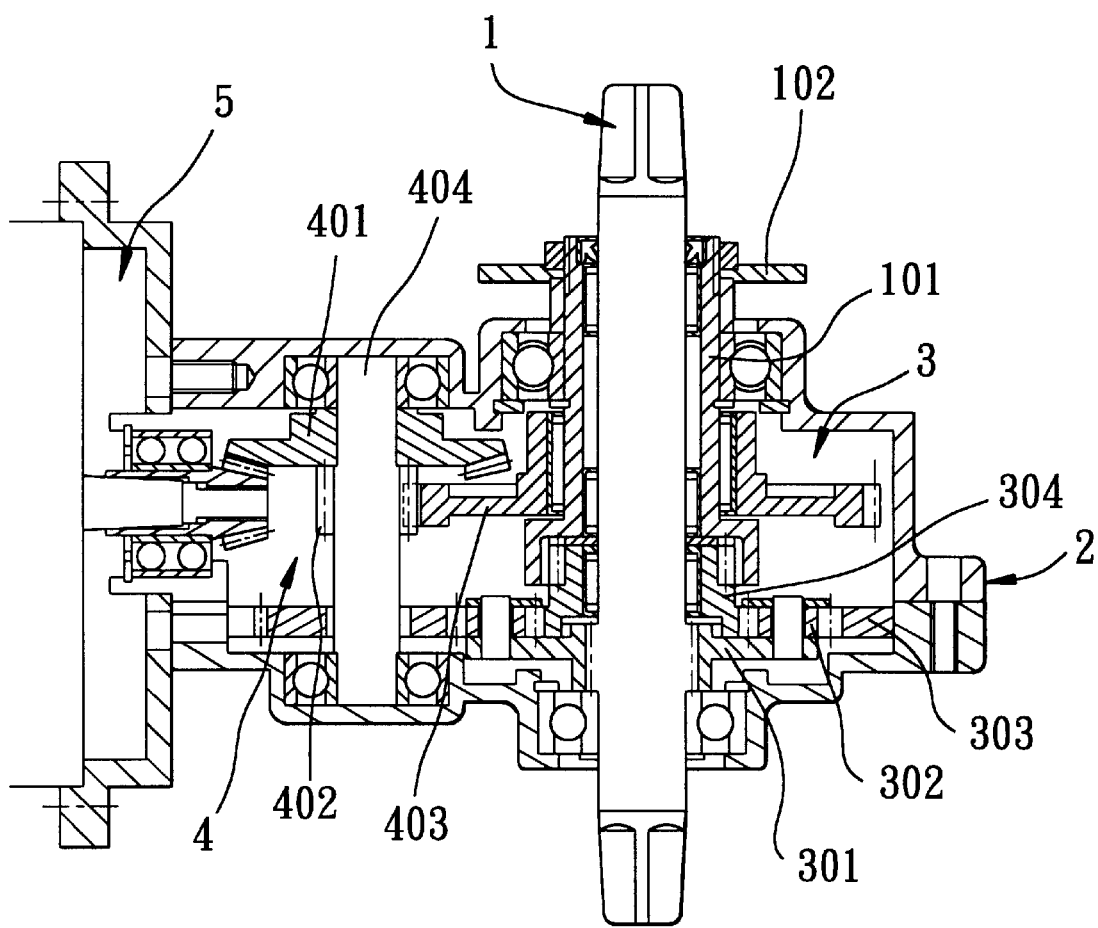
FIG. 1 is a sectional view of a conventional transmission assembly for an electrically powered bicycle.
Figure 2:
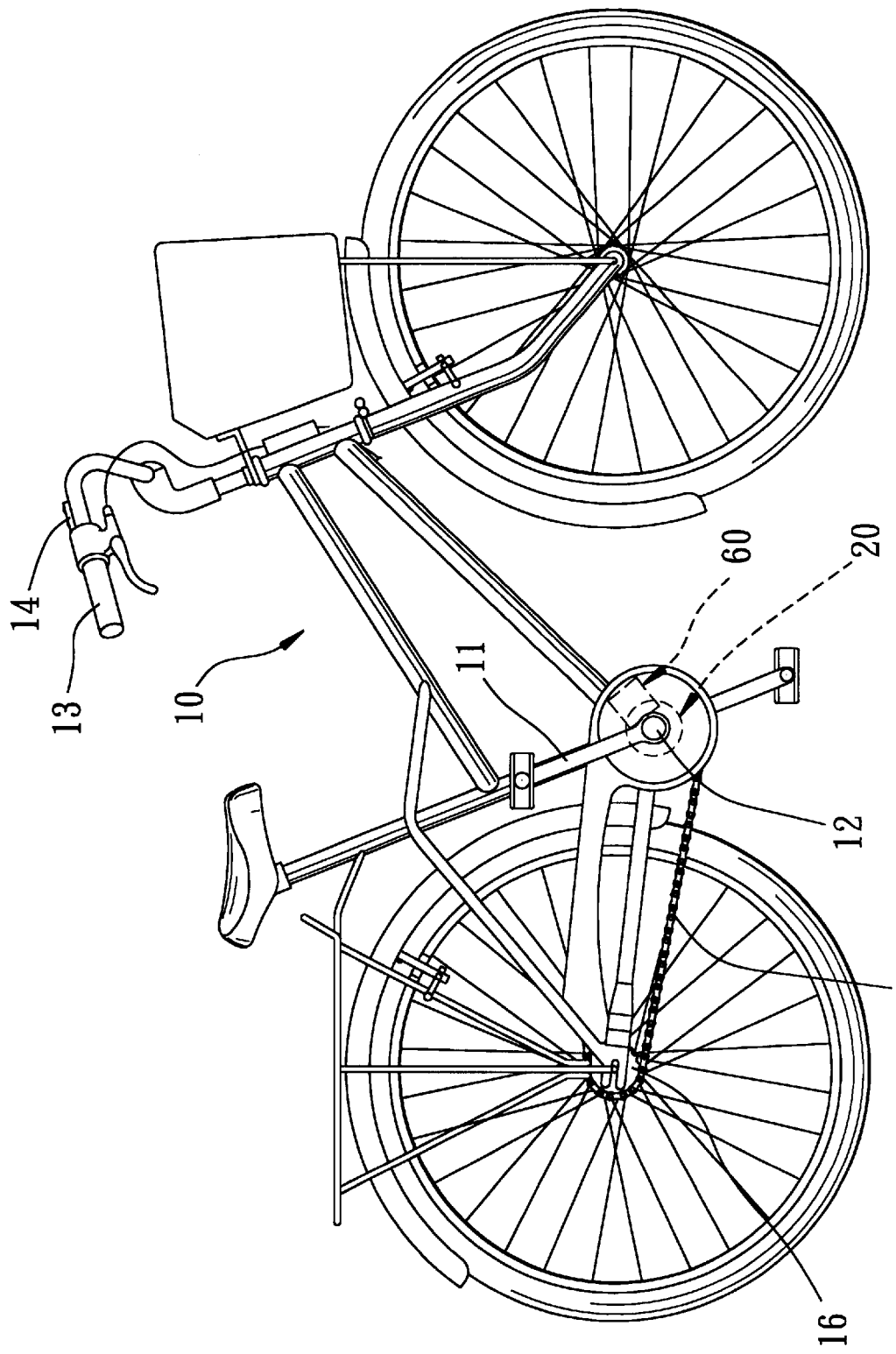
FIG. 2 is a side view of an electrically powered bicycle which is provided with a transmission assembly of this invention.

Referring to FIG. 2, a preferred embodiment of a transmission assembly according to this invention is disposed on an electrically powered bicycle 10 which is shown to include two pedal members 11 that are fixed to two ends of a spindle 12, a handle 13 that is provided with a controller 14, a chain 15, a rear sprocket 16, and an electrical transmission unit 60.

Figure 3:
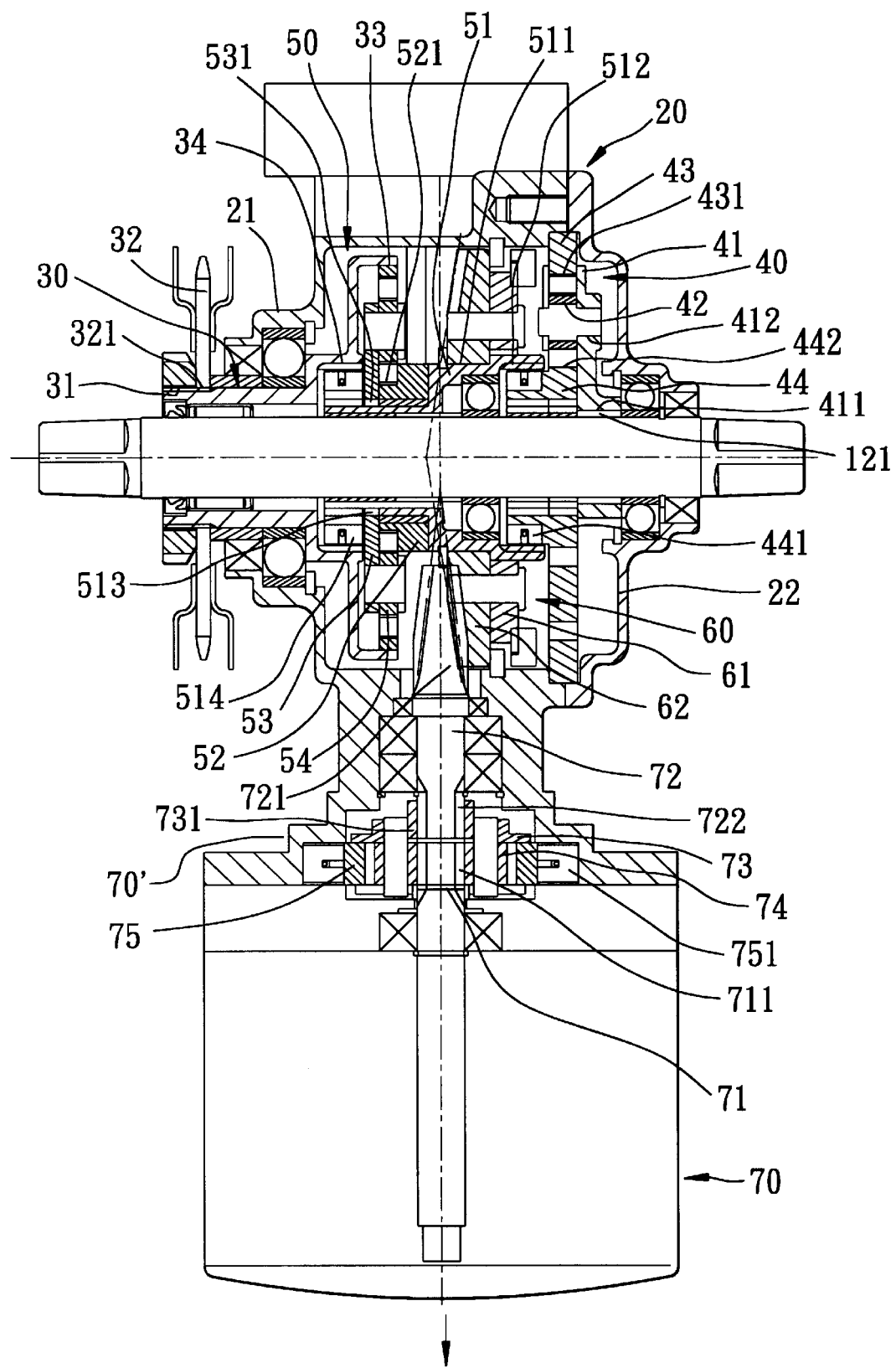
FIG. 3 is a sectional top view of a preferred embodiment of the transmission assembly according to this invention.

FIG. 3 shows the preferred embodiment, which includes a spindle housing 20 that houses the spindle 12 therein, a sprocket-mounting sleeve 30, a manual transmission unit 40, an auxiliary speed-reducing device 50, the electrical transmission unit 60, and a motor 70. The manual transmission unit 40 transfers rotation of the spindle 12 to a front sprocket 32. The electrical transmission unit 60 transfers rotation of a motor shaft 71 of a motor 70 to the front sprocket 32.

The spindle housing 20 consists of a left housing half 21 and a right housing half 22.

Figure 6:
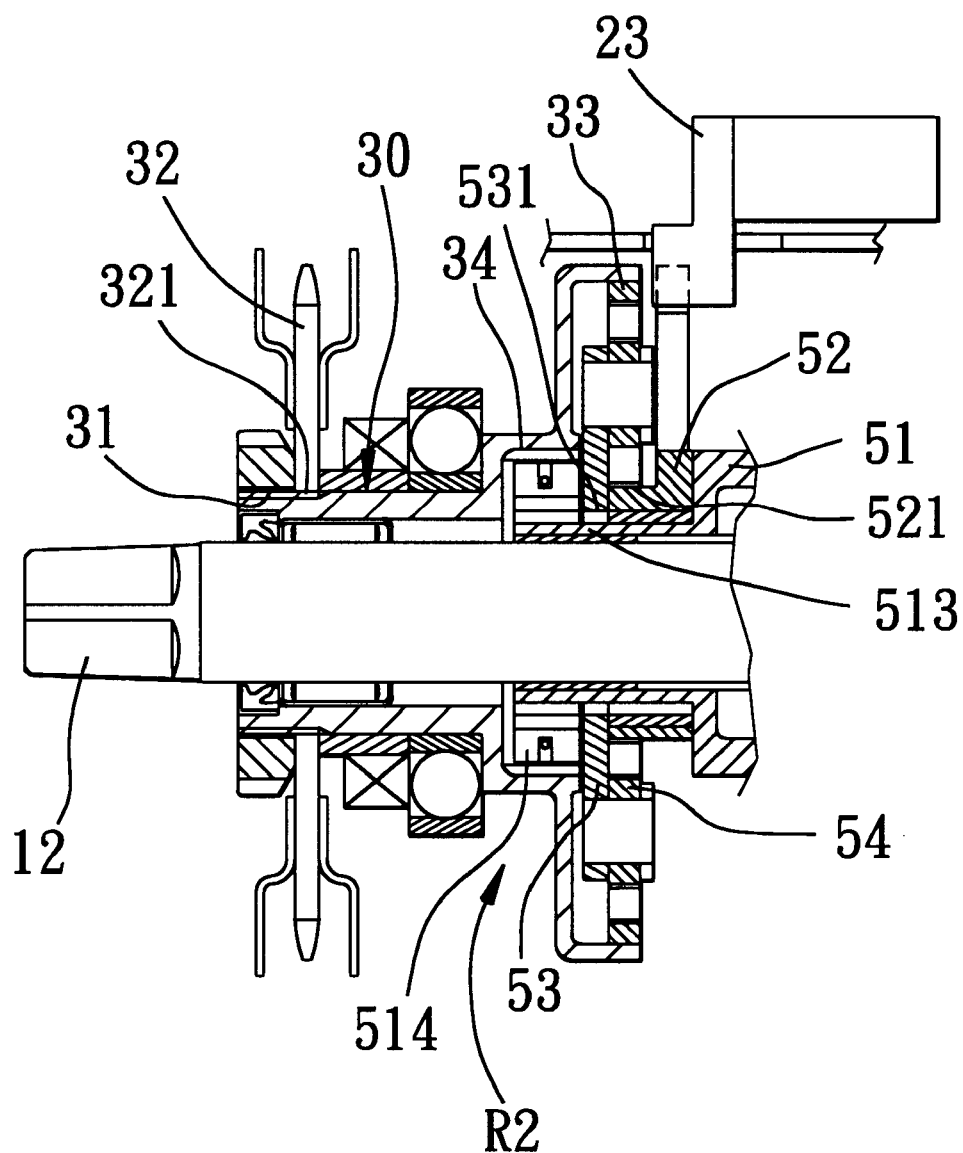
FIG. 6 is a schematic front view illustrating how an auxiliary speed-reducing device is connected to an electrical transmission unit of the preferred embodiment.
Figure 7:
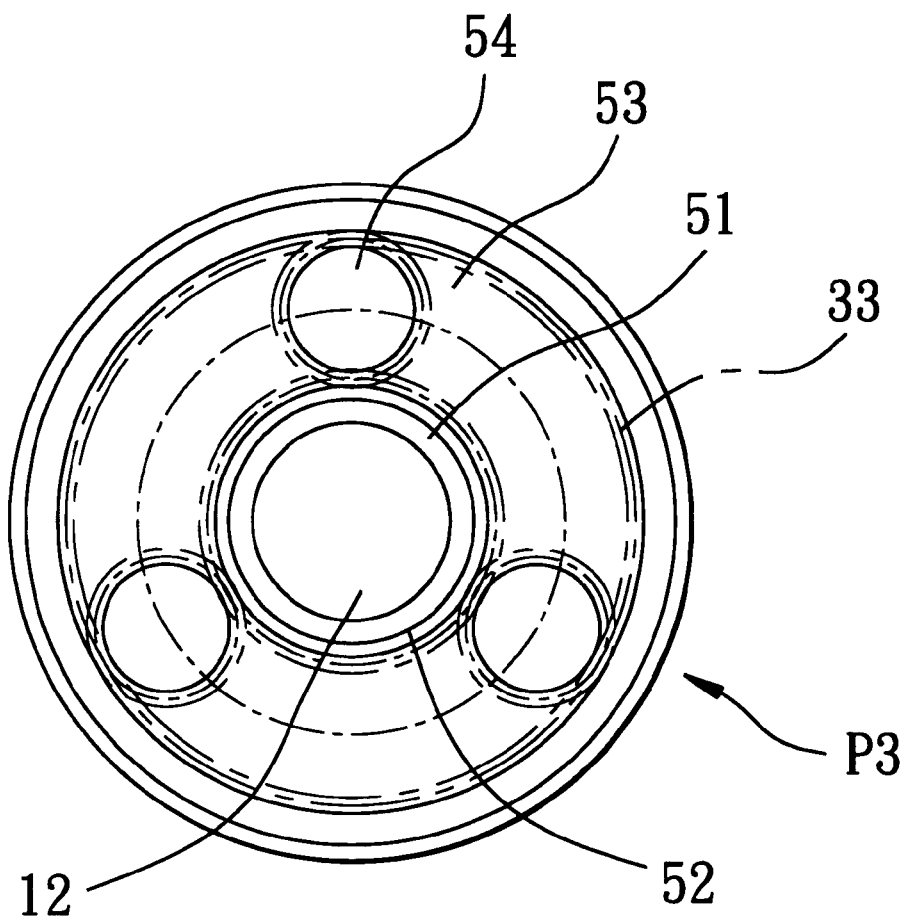
FIG. 7 illustrates the auxiliary speed-reducing device of the preferred embodiment, which is shaped as a planetary gear device and which is viewed from the right side of the bicycle.

Referring to FIGS. 3 and 6, the sprocket-mounting sleeve 30 has an externally toothed portion 31 that engages an internally toothed portion 321 of the front sprocket 32, and two internally toothed portions 33, 34.

Figure 4:
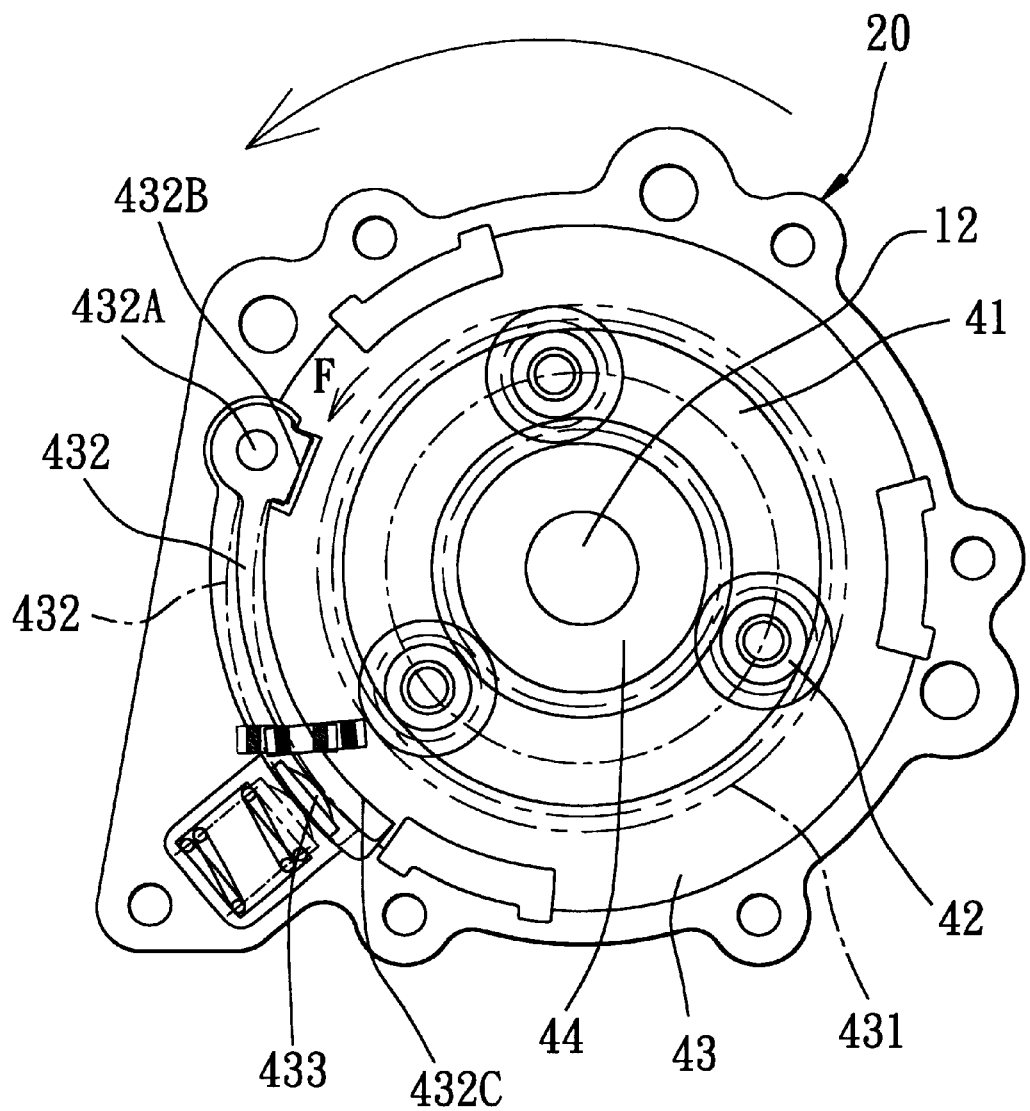
FIG. 4 is a schematic side view, which illustrates a first planetary gear device of the preferred embodiment and which is viewed from the right side of the bicycle.
Figure 5:
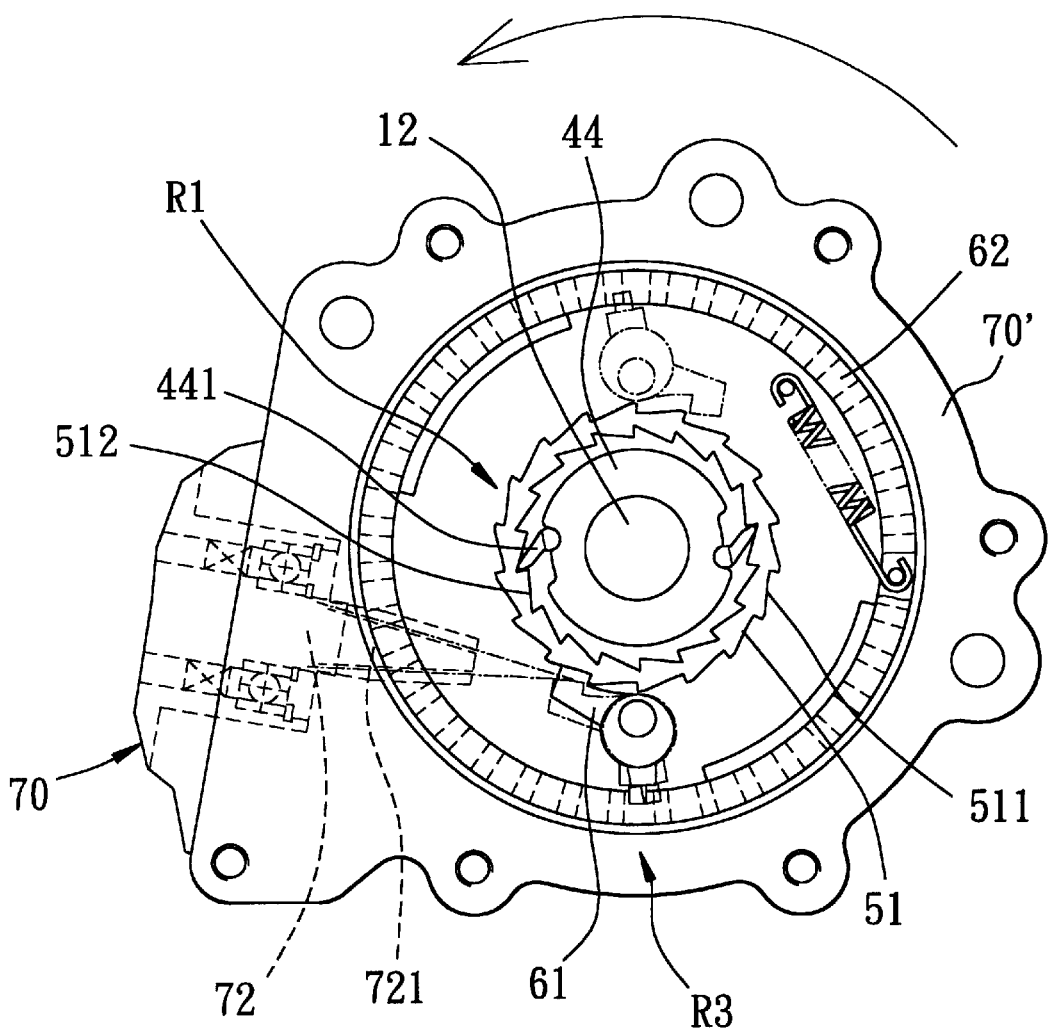
FIG. 5 is a schematic side view, which illustrates how two ratchet mechanisms are connected to the first planetary gear device of the preferred embodiment and which is viewed from the right side of the bicycle.

Referring to FIGS. 3, 4 and 5, the manual transmission unit 40 is shaped as a first planetary gear device (P1) (see FIG. 4) which includes a first planetary gear carrier 41, a plurality of first planetary gears 42, a first ring gear 43, a crank-accommodating space 43', a crank 432, a spring-biased contact switch 433, and a first sun gear 44.

The first planetary gear carrier 41 is formed with an internally toothed portion 411 that engages an externally toothed portion 121 of the spindle 12 so as to rotate the first planetary gear carrier 41 in a first or counterclockwise direction when the pedal members 2 are turned forwardly to rotate the spindle 12 in the first direction.

The first planetary gears 42 are mounted pivotally on the first planetary gear carrier 41.

The first ring gear 43 is disposed rotatably in the spindle housing 20, and meshes with the first planetary gears 42.

The crank-accommodating space 43' is defined between the ring gear 43 and the spindle housing 20.

The contact switch 433 is disposed in the spindle housing 20, and extends into the crank-accommodating space 43'.

The crank 432 is confined within the crank-accommodating space 43', and is mounted rotatably on the spindle housing 20 by a pivot 432A. When a torque applied to the pedal members 11 (see FIG. 2) reaches a preset value, the first ring gear 43 pushes and rotates a short crank arm 432B of the crank 432 so that a long crank arm 432C of the crank 432 rotates to contact the contact switch 433, thereby activating the electrical transmission unit 60.

The first sun gear 44 is sleeved rotatably on the spindle 12, and meshes with the first planetary gears 42 so as to rotate in the first direction when the first planetary gear carrier 41 rotates in the first direction.

A driving sleeve 51 is sleeved rotatably on the spindle 12.

A first ratchet mechanism (R1) (see FIG. 5) connects the first sun gear 44 to the driving sleeve 51 so as to rotate the driving sleeve 51 synchronously with the first sun gear 44 when the first sun gear 44 rotates in the first direction and so as not to transfer rotation of the driving sleeve 51 to the first sun gear 44. In this embodiment, the first ratchet mechanism (R1) (see FIG. 5) includes a first pawl unit consisting of two diametrically opposed first pawl members 441 that are fixed to the first sun gear 44, and an internal ratchet toothed portion 512 of the driving sleeve 51. Because the first pawl members 441 engage the ratchet toothed portion 512, the driving sleeve 51 can rotate synchronously with the first sun gear 44 only in a counterclockwise direction.

A second ratchet mechanism (R2) (see FIG. 6) connects the driving sleeve 51 to the sprocket-mounting sleeve 30 so as to rotate the sprocket-mounting sleeve 30 synchronously with the driving sleeve 51 when the driving sleeve 51 rotates in the first direction, and so as not to transfer rotation of the sprocket-mounting sleeve 30 to the driving sleeve 51 when the front sprocket 32 rotates. In this embodiment, the second ratchet mechanism (R2) (see FIG. 6) includes a second pawl unit 514 that is fixed to the driving sleeve 51, and the internally toothed portion 34 of the sprocket-mounting sleeve 30, which engages the second pawl unit 514 so that the sprocket-mounting sleeve 30 can rotate synchronously with the driving sleeve 51 only in a counterclockwise direction.

As such, when the pedal members 11 (see FIG. 2) are turned forwardly, the spindle 12 and the first sun gear 44 rotate in the first or counterclockwise direction so as to rotate the driving sleeve 51, the sprocket-mounting sleeve 30 and the front sprocket 32 via the first and second ratchet mechanisms (R1, R2) (see FIGS. 5 and 6).

Figure 8:
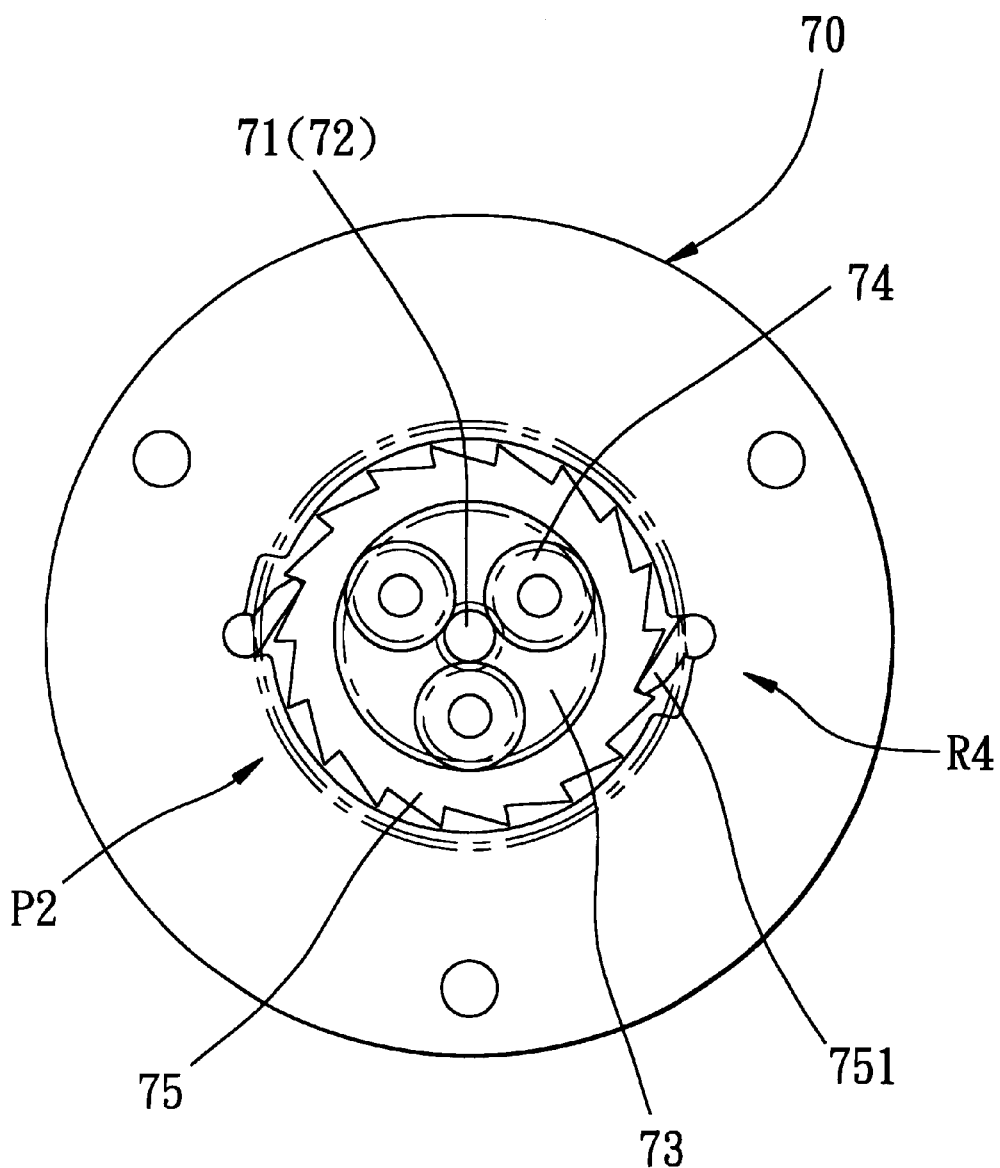
FIG. 8 illustrates how a second planetary gear device is mounted on a motor shaft of the preferred embodiment.

Referring to FIGS. 3, 5 and 8, the electrical transmission unit 60 includes the controller 14 (see FIG. 2), the motor 70, the motor shaft 71, a driven shaft 72, a second planetary gear device (P2) (see FIG. 8), a bevel gear set, and a third ratchet mechanism (see FIG. 5).

The controller 14 (see FIG. 2) can be actuated to rotate the motor shaft 71 of the motor 70.

The driven shaft 72 is journalled in the spindle housing 20, and is aligned with and adjacent to the motor shaft 71.

The second planetary gear device (P2) (see FIG. 8) connects the driven shaft 72 to the motor shaft 71 so as to rotate the driven shaft 72 in a second direction at a speed that is smaller than that of the motor shaft 71. Each of the motor shaft 71 and the driven shaft 72 has an externally toothed portion 711, 721.

In this embodiment, the second planetary gear device (P2) (see FIG. 8) includes a plurality of second planetary gears 74, a second planetary gear carrier 73, a motor housing 70', a second ring gear 75, and a fourth ratchet mechanism (R4) (see FIG. 8).

The second planetary gears 74 mesh with the externally toothed portion 711 of the motor shaft 71, and are mounted pivotally on the second planetary gear carrier 73.

The second planetary gear carrier 73 has an internally toothed portion 731 that engages the externally toothed portion 722 of the driven shaft 72.

The motor housing 70' is fixed relative to the spindle housing 20 so as to house the motor 70 therewithin.

The second ring gear 75 is disposed rotatably in the motor housing 70', and meshes with the second planetary gears 74.

The fourth ratchet mechanism (R4) (see FIG. 8) is disposed between the motor housing 70' and the second ring gear 75 so as to transfer rotation of the motor shaft 71 to the driven shaft 72 only when the motor shaft 71 rotates in the second direction. In this embodiment, the fourth ratchet mechanism (R4) includes a fourth pawl unit consisting of two diametrically opposed fourth pawl members 751 that are fixed to the motor housing 70', and an external ratchet toothed portion 752 that engages the fourth pawl members 751.

The bevel gear set transfers rotation of the driven shaft 72 to the driving sleeve 51. In this embodiment, the bevel gear set includes a driving bevel gear 721 that is fixed to the driven shaft 72, and a driven bevel gear 62 that meshes with the driving bevel gear 721.

The third ratchet mechanism (R3) (see FIG. 5) connects the bevel gear set to the driving sleeve 51 so as to rotate the driving sleeve 51 in the first direction when the driven shaft 72 rotates in the second direction, and so as not to transfer rotation of the driving sleeve 51 to the driven shaft 72 when the pedal members 11 (see FIG. 2) are actuated. In this embodiment, the third ratchet mechanism (R3) includes a third pawl unit 61 that is fixed to the driven bevel gear 62, and an external ratchet toothed portion 511 of the driving sleeve 51, which engages the third pawl unit 61 so as to rotate the driving sleeve 51 synchronously with the driven bevel gear 62 only in the second direction.

When it is desired to use the electrical transmission unit 60, the controller 14 (see FIG. 2) is actuated to rotate the motor shaft 71 in the second direction so that the second planetary gear device (P2) (see FIG. 8) rotates the driven shaft 72 in the second direction. Then, the driving bevel gear 721 rotates the driven bevel gear 62 and the driving sleeve 51 in the second direction. In this way, the front sprocket 32 can also be rotated.

Note that when the pedal members 11 (see FIG. 2) are turned rearwardly, because the second planetary gear device (P2) (see FIG. 8) is disposed between the motor shaft 71 and the driven shaft 72, torque cannot be transferred from the driven shaft 72 to the motor shaft 71.

Referring to FIGS. 3, 5, 6 and 7, the auxiliary speed-reducing device 50 includes a third planetary gear device (P3) (see FIG. 7) that includes a third sun gear 52, a third planetary gear carrier 53, a plurality of third planetary gears 54, and a locking rod 23.

The third sun gear 52 is sleeved rotatably on the driving sleeve 51.

The third planetary gear carrier 53 has an internally toothed portion 531 that engages the externally toothed portion 513 of the driving sleeve 51.

The third planetary gears 54 mesh with the third sun gear 52 and the internally toothed portion 33 of the sprocket-mounting sleeve 30.

The locking rod 23 is disposed movably in the spindle housing 20, and is connected operably to the controller 14 (see FIG. 2). By operating the controller 14 (see FIG. 2), the locking rod 23 can move to press against and lock the third sun gear 52 in the spindle housing 20 so as to prevent rotation of the third sun gear 52 on the spindle 12, thereby rotating the third planetary gears 53 and the sprocket-mounting sleeve 30 at an increased rotational speed ratio. In this way, a greater torque can be output from the electrical transmission unit 60.

With this invention thus explained, it is apparent that numerous modifications and variations can be made without departing from the scope and spirit of this invention. It is therefore intended that this invention be limited only as indicated by the appended claims.

I claim:

1. A bicycle including a spindle housing, a spindle disposed within said spindle housing, two pedal members secured to two ends of said spindle, a front sprocket, and a transmission assembly including a manual transmission unit for transferring rotation of said spindle to said front sprocket, a motor with a motor shaft that is perpendicular to said spindle, and an electrical transmission unit for transferring rotation of said motor shaft to said front sprocket, wherein the improvement comprises:

said spindle having an outer surface that is formed with an externally toothed portion;

said manual transmission unit being shaped as a first planetary gear device which includes
      a first planetary gear carrier formed with an internally toothed portion that engages said externally toothed portion of said spindle so as to rotate said first planetary gear carrier in a first direction when said pedal members are turned forwardly so as to rotate said spindle in said first direction,
      a plurality of first planetary gears mounted pivotally on said first planetary gear carrier,
      a first ring gear disposed rotatably in said spindle housing and meshing with said first planetary gears,
      a crank-accommodating space defined between said first ring gear and said spindle housing,
      a contact switch disposed in said spindle housing and extending into said crank-accommodating space,
      a crank confined within said crank-accommodating space and mounted pivotally on said spindle housing, said crank being pushed by said first ring gear to rotate and contact said contact switch so as to activate said electrical transmission unit when a torque applied to said pedal members reaches a preset value, and
      a first sun gear sleeved rotatably on said spindle and meshing with said first planetary gears so as to rotate in said first direction when said first planetary gear carrier rotates in said first direction;

a driving sleeve which is sleeved rotatably on said spindle;

a first ratchet mechanism connecting said first sun gear to said driving sleeve so as to rotate said driving sleeve synchronously with said first sun gear when said first sun gear rotates in said first direction and so as not to transfer rotation of said driving sleeve to said first sun gear;

a sprocket-mounting sleeve, on which said front sprocket is fixed;

a second ratchet mechanism connecting said driving sleeve to said sprocket-mounting sleeve so as to rotate said sprocket-mounting sleeve synchronously with said driving sleeve when said driving sleeve rotates in said first direction, and so as not to transfer rotation of said sprocket-mounting sleeve to said driving sleeve when said front sprocket rotates; and said electrical transmission unit including
      a controller for activating said motor,
      a driven shaft journalled in said spindle housing and aligned with and adjacent to said motor shaft,
      a second planetary gear device which connects said driven shaft to said motor shaft so as to rotate said driven shaft in a second direction at a speed that is smaller than that of said motor shaft,
      a bevel gear set for transferring rotation of said driven shaft to said driving sleeve, and
      a third ratchet mechanism connecting said bevel gear set to said driving sleeve so as to rotate said driving sleeve in said first direction when said driven shaft rotates in said second direction, and so as not to transfer rotation of said driving sleeve to said driven shaft when said pedal members are actuated.

2. The bicycle as claimed in claim 1, wherein each of said motor shaft and said driven shaft has an externally toothed portion, said second planetary gear device including:

a plurality of second planetary gears meshing with said externally toothed portion of said motor shaft;

a second planetary gear carrier, on which said second planetary gears are mounted pivotally, said second planetary gear carrier having an internally toothed portion that engages said externally toothed portion of said driven shaft;

a motor housing fixed relative to said spindle housing so as to house said motor therewithin;

a second ring gear disposed rotatably in said motor housing and meshing with said second planetary gears; and a fourth ratchet mechanism disposed between said motor housing and said second ring gear so as to transfer rotation of said motor shaft to said driven shaft only when said motor shaft rotates in said second direction.

3. The bicycle as claimed in claim 1, wherein said driving sleeve has an externally toothed portion, said sprocket-mounting sleeve having an internally toothed portion, said electrical transmission unit further having an auxiliary speed-reducing device which includes a third planetary gear device that includes:

a third sun gear sleeved rotatably on said driving sleeve;

a third planetary gear carrier having an internally toothed portion that engages said externally toothed portion of said driving sleeve;

a plurality of third planetary gears meshing with said third sun gear and said internally toothed portion of said sprocket-mounting sleeve; and a locking rod disposed movably in said spindle housing and connected operably to said controller, said locking rod being movable to press against and lock said third sun gear in said spindle housing upon actuation of said controller, so as to prevent rotation of said third sun gear on said spindle, thereby rotating said third planetary gears and said sprocket-mounting sleeve at an increased rotational speed ratio.

* * * * *